United States Patent
Liu et al.

(10) Patent No.: US 9,998,189 B1
(45) Date of Patent: Jun. 12, 2018

(54) ADAPTIVE DEVICE AND METHOD FOR WIRELESS NETWORK

(71) Applicant: ACCTON TECHNOLOGY CORPORATION, Hsinchu (TW)

(72) Inventors: I-Ru Liu, Taipei (TW); Pei-Sam Ho, Hsinchu (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 0 days. days.

(21) Appl. No.: 15/604,642

(22) Filed: May 24, 2017

(30) Foreign Application Priority Data

Dec. 12, 2016 (TW) .............................. 105141084 A

(51) Int. Cl.
*H04B 7/06* (2006.01)
*H04B 17/318* (2015.01)
*H04B 7/0413* (2017.01)

(52) U.S. Cl.
CPC ......... *H04B 7/0608* (2013.01); *H04B 7/0413* (2013.01); *H04B 17/318* (2015.01)

(58) Field of Classification Search
USPC .................. 375/227, 260, 267, 299; 370/329
See application file for complete search history.

(56) References Cited

U.S. PATENT DOCUMENTS

| | | | |
|---|---|---|---|
| 6,859,503 B2* | 2/2005 | Pautler | H04B 7/0417 375/299 |
| 2007/0207837 A1* | 9/2007 | Nakaya | H04B 7/0808 455/562.1 |
| 2009/0196371 A1* | 8/2009 | Yamamoto | H04B 7/0808 375/267 |
| 2011/0188586 A1* | 8/2011 | Bidigare | H04B 7/18513 375/260 |
| 2015/0289247 A1* | 10/2015 | Liu | H04B 7/0413 370/329 |
| 2016/0036508 A1* | 2/2016 | Szini | H04B 7/0814 375/227 |
| 2016/0316480 A1* | 10/2016 | Oh | H04B 7/0608 |
| 2017/0156067 A1* | 6/2017 | Huang | H04W 16/28 |

* cited by examiner

*Primary Examiner* — Eva Puente
(74) *Attorney, Agent, or Firm* — CKC & Partners Co., Ltd.

(57) ABSTRACT

The present invention discloses an adaptive device and method for wireless network. The method comprises: detecting RSSI (Received Signal Strength Indicator) of a plurality of antenna pairs of a MIMO system; selecting a first antenna pair which has the highest RSSI; using the first antenna pair to perform data transmission; detecting a data rate of the first antenna pair; and determining whether to adjust other antenna pairs to perform the data transmission according to the data rate.

10 Claims, 3 Drawing Sheets

ADAPTIVE DEVICE AND METHOD FOR WIRELESS NETWORK

RELATED APPLICATIONS

This application claims priority to Taiwan Application Serial Number 105141084, filed Dec. 12, 2016, which is herein incorporated by reference.

BACKGROUND

Field of Invention

The present invention relates to an adaptive device and method for wireless network.

Description of Related Art

Generally speaking, the quantity of input antennae of a MIMO (Multiple Input Multiple Output) antenna system is equal to output antennae. However, the MIMO system is unable to have extra diversity under the condition of the equal quantity. In addition, in the existing technology, most choosing methods of antenna pair may not be accurate enough since these methods are merely based on the value of RSSI. In the transmission process of uplink and downlink, noise and attenuation are not always occurred between the transmitter and receiver symmetrically. Rogue stations may appear everywhere, so only through RSSI (Received Signal Strength Indicator) judgement mechanism is insufficient.

SUMMARY

The present invention provides an adaptive device and method for wireless network, which is adapted for a MIMO system of a wireless area network. The present invention chooses one antenna pair of the plurality of antenna pairs of the MIMO system to perform an uplink or downlink transmission according to both the RSSI and the data transmission rate. Compared to the transitional way that choosing the antennal pair is merely based on the RSSI. The present invention further instantly adjusts which antenna pair to perform transmission according to the data transmission rate that reflects the real-time communication quality. The wireless network adaptive device of the present invention chooses the transmission antenna based on the RSSI and the data transmission rate simultaneously in order to solve the problem of unexpected noises and rogue stations. Accordingly, the network quality will be improved.

An aspect of the disclosure is to provide a wireless network adaptive device, which is adapted for choosing one of a plurality of antenna pairs of a MIMO system to be a transmission antenna pair to perform data transmission. The wireless network adaptive device comprises a detection unit, a storage unit, and a processing unit. The detection unit is connected to the plurality of antenna pairs, wherein the detection unit detects a RSSI of the plurality of antenna pairs. The storage unit is connected to the detecting unit, wherein the storage unit stores the RSSI of each of the plurality of antenna pairs detected by the detection unit. The processing unit is connected to the detection unit and the storage unit, wherein the processing unit chooses a first antenna pair which has the highest RSSI and a final antenna pair which has the lowest RSSI according to the RSSI of the plurality of antenna pairs stored in the storage unit, the processing unit also chooses the first antenna pair or the final antenna pair to be the transmission antenna pair, the processing unit further controls the detection unit to detect a data transmission rate of the transmission antenna pair, and the processing unit switches the first antenna pair or the final antenna pair to be the transmission antenna pair according to a variety of a data transmission rate.

In one embodiment of the present invention, wherein the transmission antenna pair further performs an uplink data transmission and a downlink data transmission, when the processing unit determines that an uplink data transmission rate is abnormal according to a detection result of the detection unit, the processing unit changes the transmission antenna pair used for currently performing the uplink data transmission from first antenna pair to the final antenna pair, or the processing unit changes the transmission antenna pair used for currently performing the uplink data transmission from final antenna pair to the first antenna pair.

In one embodiment of the present invention, when the uplink data transmission rate is abnormal, the uplink data transmission rate is less than the downlink data transmission rate to reach a first threshold, the processing unit changes the transmission antenna pair used for currently performing the uplink data transmission from first antenna pair to the final antenna pair, or the processing unit changes the transmission antenna pair used for currently performing the uplink data transmission from final antenna pair to the first antenna pair.

In one embodiment of the present invention, when the uplink data transmission rate is abnormal, the uplink data transmission rate is less than a historical uplink data transmission rate to reach a second threshold, the processing unit changes the transmission antenna pair used for currently performing the uplink data transmission from first antenna pair to the final antenna pair, or the processing unit changes the transmission antenna pair used for currently performing the uplink data transmission from final antenna pair to the first antenna pair.

In one embodiment of the present invention, wherein the transmission antenna pair further performs an uplink data transmission and a downlink data transmission, when the processing unit determines that a downlink data transmission rate is abnormal according to a detection result of the detection unit, the processing unit changes the transmission antenna pair used for currently performing the downlink data transmission from first antenna pair to the final antenna pair, or the processing unit changes the transmission antenna pair used for currently performing the uplink data transmission from final antenna pair to the first antenna pair.

In one embodiment of the present invention, when the downlink data transmission rate is abnormal, the downlink data transmission rate is less than the uplink data transmission rate to reach a first threshold, the processing unit changes the transmission antenna pair used for currently performing the downlink data transmission from first antenna pair to the final antenna pair, or the processing unit changes the transmission antenna pair used for currently performing the downlink data transmission from final antenna pair to the first antenna pair.

In one embodiment of the present invention, when the downlink data transmission rate is abnormal, the downlink data transmission rate is less than a historical downlink data transmission rate to reach a second threshold, the processing unit changes the transmission antenna pair used for currently performing the downlink data transmission from first antenna pair to the final antenna pair, or the processing unit changes the transmission antenna pair used for currently performing the downlink data transmission from final antenna pair to the first antenna pair.

An aspect of the disclosure is to provide a wireless network adaptive method. The method is adapted for choosing one of a plurality of antenna pairs of a MIMO system of a wireless area network to be a transmission antenna pair to perform data transmission. The wireless network adaptive method comprises the following steps: detecting a RSSI of the plurality of antenna pairs; choosing a first antenna pair which has the highest RSSI and a final antenna pair which has the lowest RSSI according to the RSSI of the plurality of antenna pairs; choosing the first antenna pair or the final antenna pair to be the transmission antenna pair to perform an uplink data transmission and a downlink data transmission; detecting an uplink data transmission rate and a downlink data transmission rate of the transmission antenna pairs; adjusting other antenna pairs to perform data transmission according to the uplink data transmission rate and the downlink data transmission rate; changing the transmission antenna pair used for currently performing the uplink data transmission from first antenna pair to the final antenna pair or changing the transmission antenna pair used for currently performing the uplink data transmission from final antenna pair to the first antenna pair when the uplink data transmission rate is abnormal; and changing the transmission antenna pair used for currently performing the downlink data transmission from first antenna pair to the final antenna pair or changing the transmission antenna pair used for currently performing the downlink data transmission from final antenna pair to the first antenna pair when the downlink data transmission rate is abnormal.

In one embodiment of the present invention, when the uplink data transmission rate is abnormal, the uplink data transmission rate is less than the downlink data transmission rate to reach a first threshold or the uplink data transmission rate is less than a historical uplink data transmission rate to reach a second threshold, the processing unit changes the transmission antenna pair used for currently performing the uplink data transmission from first antenna pair to the final antenna pair, or the processing unit changes the transmission antenna pair used for currently performing the uplink data transmission from final antenna pair to the first antenna pair.

In one embodiment of the present invention, when the downlink data transmission rate is abnormal, the downlink data transmission rate is less than the uplink data transmission rate to reach a first threshold or the downlink data transmission rate is less than a historical downlink data transmission rate to reach a second threshold, the processing unit changes the transmission antenna pair used for currently performing the downlink data transmission from first antenna pair to the final antenna pair, or the processing unit changes the transmission antenna pair used for currently performing the downlink data transmission from final antenna pair to the first antenna pair.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
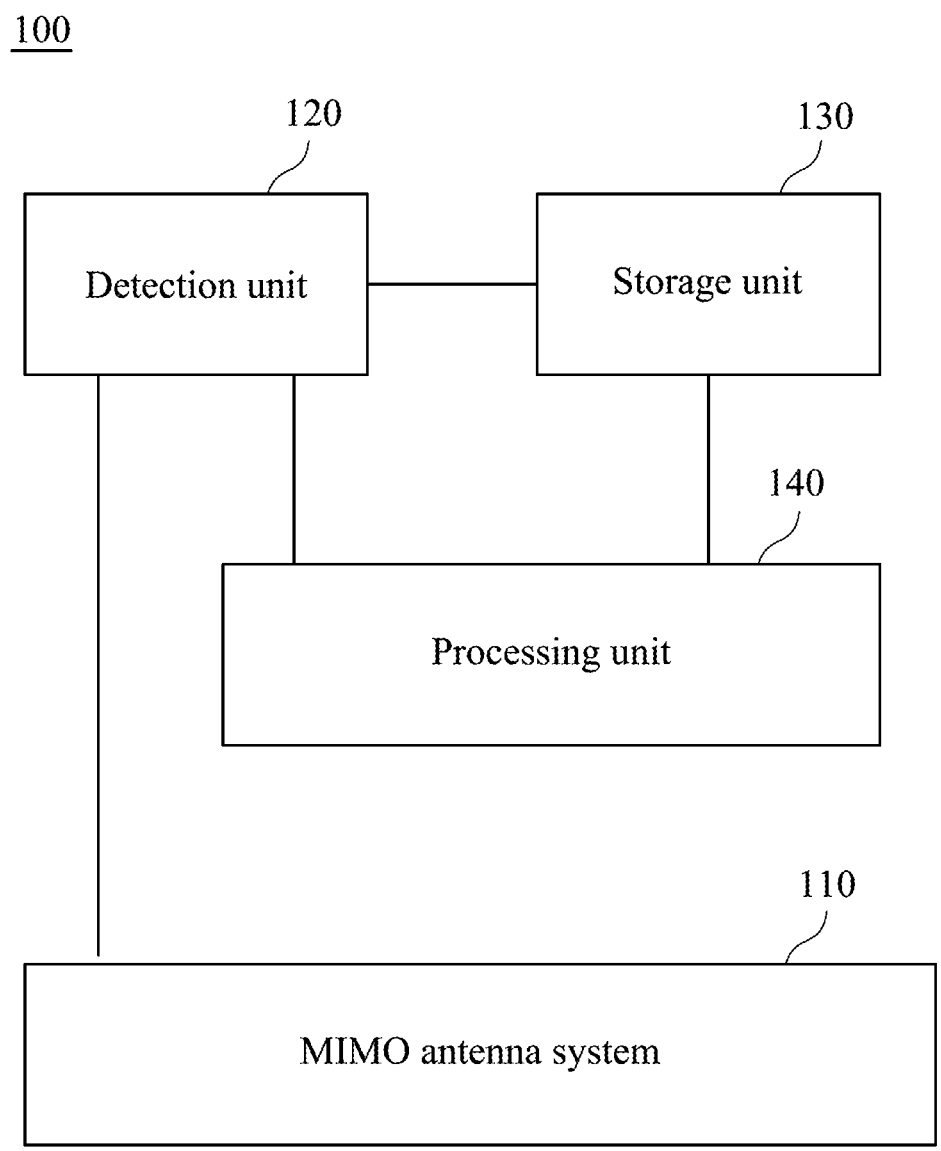
FIG. 1 is a block diagram of the wireless network adaptive device according to the first embodiment of the present invention.

Reference will now be made in detail to the present embodiments of the invention, examples of which are illustrated in the accompanying drawings. Wherever possible, the same reference numbers are used in the drawings and the description to refer to the same or like parts.

The present invention discloses a wireless network adaptive device, adapted for a MIMO antenna system of a wireless area network. The wireless network adaptive device chooses one antenna pair of a plurality of antenna pairs of the MIMO antenna system to perform data transmission according to a Received Signal Strength Indicator (RSSI) and a data transmission rate. FIG. 1 is a block diagram of the wireless network adaptive device according to the first embodiment of the present invention. The wireless network adaptive device 100 can be operated a MIMO antenna system 110. The wireless network adaptive device 100 includes a detection unit 120, storage unit 130, and the processing unit 140. The detection unit 120 can be a sensing element which is used to sense the RSSI, such like a wireless transceiver unit. The detection unit 120 is connected to the plurality of antenna pairs of the MIMO antenna system 110, and the detection unit detects the RSSI of the plurality of antenna pairs. The storage unit 130 can be a hard disk, a memory, or a micro hard disk. The storage unit 130 is connected to the detection unit 120, and the storage unit 130 is used to store the RSSI of each of the plurality of antenna pairs detected by the detection unit 120. The processing unit 140 is connected to the detection unit 120 and the storage unit 130. The processing unit 140 can be a processor with arithmetic and control functions. The processing unit 140 chooses one of the antenna pairs of the MIMO antenna system 110 to perform data transmission.

Figure 2:
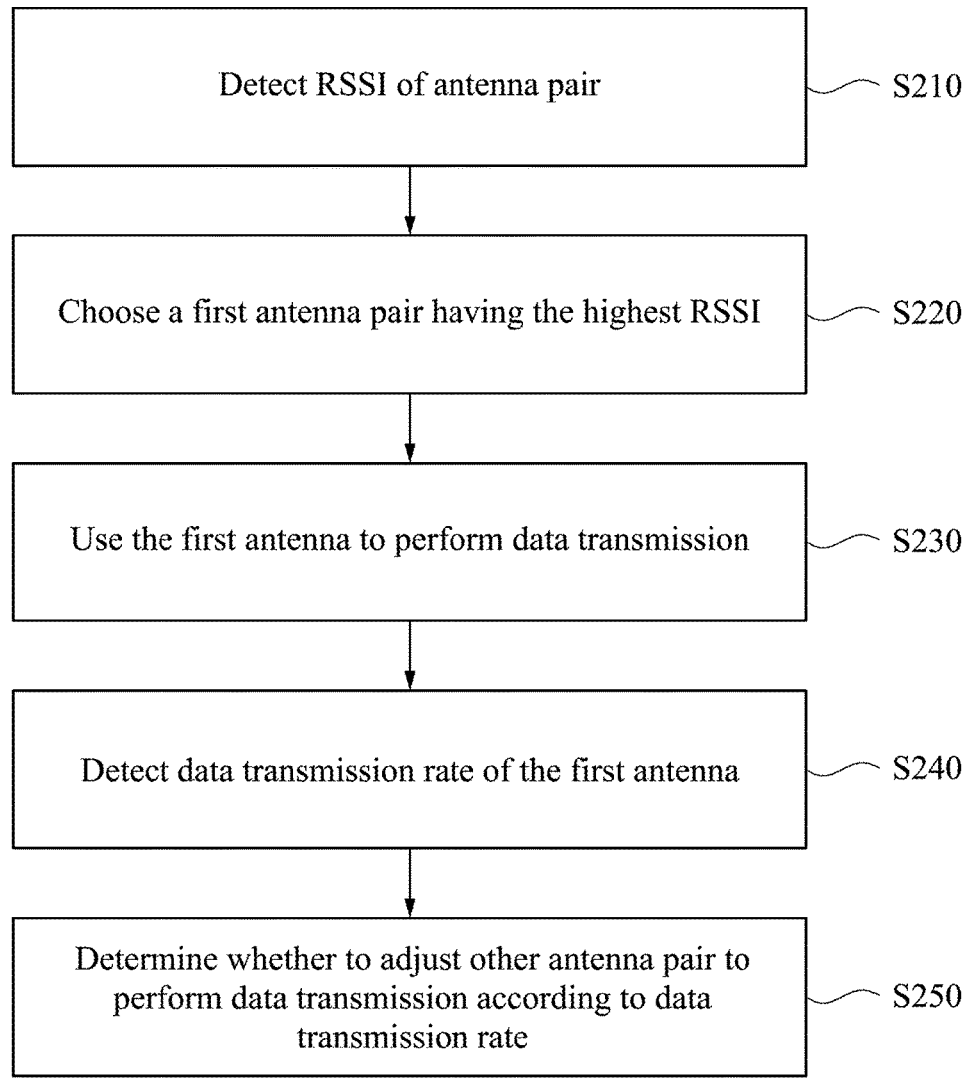
FIG. 2 is a flowchart of the wireless network adaptive method according to the first embodiment of the present invention.

FIG. 2 is a flowchart of the wireless network adaptive method according to the first embodiment of the present invention. Firstly, the detection unit 120 detects RSSI of each of the plurality antenna pairs (Step S210). The processing unit 140 chooses a first antenna pair which has the highest RSSI according to the RSSI of each of the plurality antenna pairs stored in the storage unit 130 (Step S220). In other words, the wireless network adaptive method chooses the antenna pair which has the RSSI peak to be the first antenna pair. Next, the first antenna pair is used to perform data transmission (Step S230). The processing unit 140 controls the detection unit 120 to detect a data transmission rate of the first antenna pair (Step S240). The processing unit 140 determines that whether to adjust other antenna pairs with different RSSI to perform the data transmission according to the data transmission rate (Step S250).

From the Step S210 to the Step S240, the first antenna pair which has the highest RSSI is chosen. The wireless network adaptive method uses the first antenna pair to perform the data transmission; such like the method uses the first antenna pair to perform an uplink data transmission and a downlink data transmission. This embodiment sets the first antenna pair to be a transmission antenna pair firstly. However, the present invention is not limited thereto. In the Step S250, the processing unit 140 determines that whether to adjust other antenna pairs to perform the data transmission according to the data transmission rate.

Figure 3:
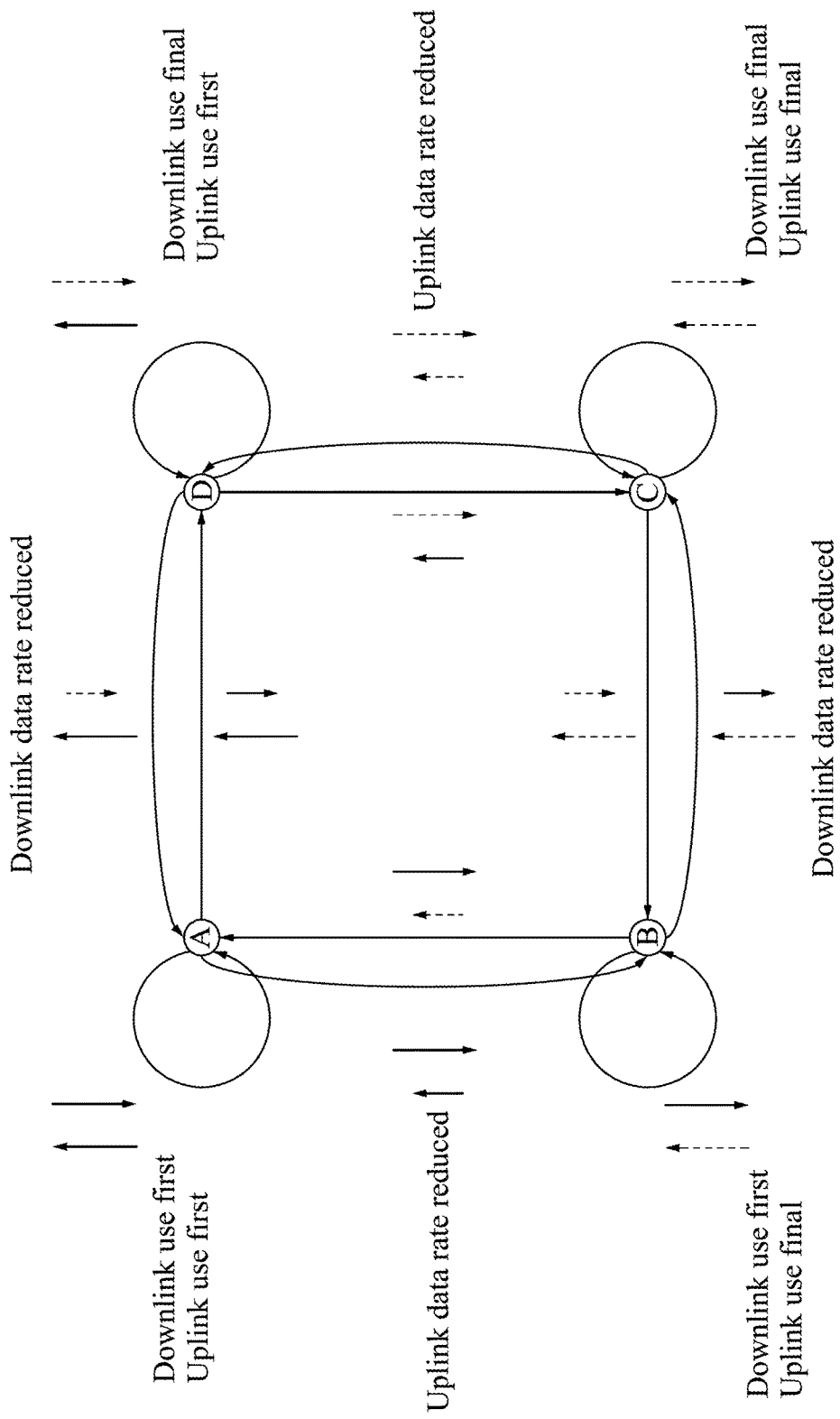
FIG. 3 is a schematic diagram of adjusting antenna pairs according to the first embodiment of the present invention.

FIG. 3 is a schematic diagram of adjusting antenna pairs according to the first embodiment of the present invention. The arrow represents the data transmission states. The solid arrow is represented if using the first antenna to perform the data transmission, and the dotted arrow is represented if using the final antenna to perform the data transmission. The final antenna pair is defined as the antenna pair which has the lowest RSSI or the RSSI null. In addition, the up arrow represents the uplink data transmission rate, and the down arrow represents the downlink data transmission rate. For the 2×2 MIMO antenna system, one antenna pair is performed for the uplink and downlink transmission respectively. However, the present invention is not limited thereto. In other embodiments, the present invention can use merely one antenna or a plurality of antenna pairs to perform the uplink and downlink transmission.

Firstly, for the state transition of FIG. 3, the state transition can begin from the state A. However, the present invention is not limited thereto. In the state A, the first antenna pair is used for the downlink transmission, and the first antenna pair is used for the uplink transmission. In other words, both in the uplink and downlink paths, the antenna pair has the highest RSSI is chosen to perform the transmission. If the uplink data transmission rate and the downlink data transmission rate are balanced, or the uplink data transmission rate and the historical uplink data transmission rate are balanced, the current state is maintained. The balance state means the data transmission rate of the uplink and the downlink are equal or the uplink transmission rate is equal to the historical uplink data transmission rate. This "equal" means the difference is within a specific range. To avoid the uplink data transmission rate and the downlink data transmission rate changes at the same so as to hard to determine that variety of the difference between the uplink and the downlink transmission. Therefore, besides the comparison between the uplink data transmission rate and the downlink data transmission rate, the uplink data transmission rate also compares to the historical uplink data transmission rate in order to discover the variety of the transmission state in other embodiment. When the processing unit 140 discovers that the uplink transmission rate is reduced and the uplink data transmission rate is less than the downlink data transmission rate to reach a first threshold according to a detection result of the detection unit 120, the processing unit 140 adjusts the final antenna pair to be the uplink data transmission antenna pair. In other words, the processing unit 140 changes the antenna pair of performing the uplink data transmission, and the processing unit 140 uses the antenna pair which has the lowest RSSI to perform the uplink data transmission. In other words, the state A is changed to state B. In other embodiment, the processing unit 140 determines that the uplink data transmission rate is less than the historical first uplink data transmission rate of the first antenna pair to reach a second threshold, the processing unit 140 also adjusts the final antenna pair to be the antenna pair performing the uplink transmission. In other words, the state A is changed to state B. The historical first uplink data transmission rate is pre-stored in the storage unit 130. When the first antenna pair which has the highest RSSI to perform the data transmission, if the data transmission rate is abnormally low, that may some interference sources or rogue stations near the receiving end so as to affect the uplink data transmission rate. Accordingly, the transmission antenna pair is changed to the final antenna pair. In other words, the antenna pair which has the RSSI null performs the data transmission. The present invention uses a null value of antenna field pattern to direct to the interference source or rogue stations in order to restrain the noises. At the same time, a side lobe near the null value location of antenna field pattern is used to signal transmission to the original receiving end. The above way not only restrains the noise but also maintains the transmission efficiency.

The first threshold can be preset by a user. For example, the first threshold is defined as the difference between the uplink and downlink data transmission rate reaches higher than 20%. The second threshold also can be preset by a user. For example, the second threshold is defined as the current data transmission rate is lower than the historical data transmission rate exceeding 10%.

After the processing unit 140 changes the antenna pair performs uplink data transmission to the final antenna pair, if the uplink and the downlink data transmission rate can be return to the previous balance state, or the uplink data transmission rate and the historical uplink data transmission rate can be return to the previous balance state, and the state B is maintained. That means the uplink transmission uses the final antenna pair, and the downlink transmission uses the first antenna pair. When the processing unit 140 discovers that the downlink transmission rate is reduced and the current downlink data transmission rate is less than the uplink data transmission rate to reach the first threshold, as the previous descriptions, the processing unit 140 determines that there are some interference and rogue stations in the downlink path. The processing unit 140 changes the antenna pair which performs downlink transmission to the final antenna pair. In other words, the state B is changed to state C. The processing unit 140 determines that the downlink data transmission rate is less than the historical first downlink data transmission rate of the first antenna pair to reach the second threshold, the processing unit 140 also adjusts the final antenna pair to be the antenna pair performing the downlink transmission. In other words, the state B is changed to state C. The state C is defined that the uplink and downlink transmission both use the final antenna pair. The historical first downlink data transmission rate is pre-stored in the storage unit 130.

As above descriptions, if the uplink data transmission rate and the downlink data transmission rate can return to the balance state, or the uplink data transmission rate and the historical uplink data transmission rate can return to the balance state, the current state C is maintained. The means the uplink transmission uses the final antenna pair, and the downlink transmission uses the final antenna pair. After the processing unit 140 adjusts the final antenna pair to perform the downlink data transmission, the processing unit 140 determines that the uplink data transmission rate is reduced and the uplink data transmission rate is less than the downlink data transmission rate to reach the first threshold, as the previous descriptions, the processing unit 140 determines that there are some interference and rogue stations in the uplink path. The processing unit 140 adjusts the first antenna pair to be the antenna pair performing the uplink transmission. In other words, the state C is changed to state D. The processing unit 140 determines that the uplink data transmission rate is less than the historical final uplink data transmission rate of the final antenna pair to reach the second threshold, the processing unit 140 also adjusts the first antenna pair to be the antenna pair performing the uplink transmission. In other words, the state C is changed to state D. The historical final uplink data transmission rate is pre-stored in the storage unit 130.

As above descriptions, if the uplink data transmission rate and the downlink data transmission rate can return to the balance state, or the uplink data transmission rate and the historical uplink data transmission rate can return to the balance state, and the state D is maintained. That means the uplink transmission uses the first antenna pair, and the downlink transmission uses the final antenna pair. After the processing unit 140 adjusts the first antenna pair to perform the uplink data transmission, the processing unit 140 determines that the downlink data transmission rate is reduced and the downlink data transmission rate is less than the uplink data transmission rate to reach the first threshold, as the previous descriptions, the processing unit 140 determines that there are some interference and rogue stations in the downlink path. The processing unit 140 adjusts the first antenna pair to be the antenna pair performing the downlink transmission. In other words, the state D is changed to state A. The processing unit 140 determines that the downlink data transmission rate is less than the historical final downlink data transmission rate of the final antenna pair to reach the second threshold, the processing unit 140 also adjusts the first antenna pair to be the antenna pair performing the downlink transmission. In other words, the state D is changed to state A. The historical final downlink data transmission rate is pre-stored in the storage unit 130.

In other embodiments of the present invention, due to different uplink and downlink transmission rate, the state transition can also be a clockwise direction. For example, the state transition is started from state A, however, the present invention is not limited thereto. When the processing unit 140 finds the downlink data transmission rate is reduced and the downlink data transmission rate is less than the uplink data transmission rate to reach the first threshold according to the detection results of the detection unit 120, as above descriptions, the processing unit 140 uses the final antenna pair to perform the downlink transmission. In other words, that is from the state A to the state D. When the processing unit 140 determines that the downlink data transmission rate is less than the historical first downlink data transmission rate of the first antenna pair to reach the second threshold. The processing unit 140 uses the final antenna to perform the downlink transmission that means it is changed to the state D.

In other embodiments of the present invention, after the processing unit 140 adjusts the final antenna pair to perform the downlink transmission, if finding the uplink data transmission rate is reduced, that means the processing unit 140 determines the uplink data transmission rate is less than the downlink data transmission rate to reach the first threshold, the processing unit 140 adjusts the final antenna pair to operate the uplink transmission. In other words, the state transition is from the state D to the state C. In addition, if the processing unit 140 determines that the uplink data transmission rate is less than the historical first uplink data transmission rate of the first antenna to reach the second threshold, the processing unit 140 adjusts the final antenna pair to perform the uplink transmission. In other words, the state transition is from the state D to the state C.

In other embodiments of the present invention, after the processing unit 140 adjusts the final antenna pair to perform the uplink transmission, if the processing unit 140 determines the downlink data transmission rate is reduced and the downlink data transmission rate is less than the uplink data transmission rate to reach the first threshold, the processing unit 140 adjusts the first antenna pair to operate the downlink transmission. In other words, the state transition is changed to the state B. In addition, if the processing unit 140 determines that the downlink data transmission rate is less than the historical final downlink data transmission rate of the final antenna to reach the second threshold, the processing unit 140 adjusts the first antenna pair to perform the downlink transmission. In other words, the state transition is changed to the state B.

In other embodiments of the present invention, after the processing unit 140 adjusts the first antenna pair to perform the downlink transmission, if the processing unit 140 determines the uplink data transmission rate is reduced and the uplink data transmission rate is less than the downlink data transmission rate to reach the first threshold, the processing unit 140 adjusts the first antenna pair to operate the uplink transmission. In other words, the state transition is returned to the state A. In addition, if the processing unit 140 determines that the uplink data transmission rate is less than the historical final uplink data transmission rate of the final antenna to reach the second threshold, the processing unit 140 adjusts the first antenna pair to perform the uplink transmission. In other words, the state transition is changed to the state A.

In other embodiments of the present invention, firstly, in the state A, the uplink and the downlink transmission both use the first antenna pair which has the highest RSSI. However, if the processing unit 140 finds that the uplink and downlink data transmission rate detected by the detection unit 120 are both decreased, furthermore, the decrease is 10%, the processing unit 140 changes the transmission antenna pair currently performing the uplink and downlink transmission to a second antenna pair which has the secondary highest RSSI to perform the data transmission. For an extreme condition, if the processing unit 140 finds that the uplink and downlink data transmission rate detected by the detection unit 120 are both decreased, furthermore, the decrease is higher than 50%, the processing unit 140 changes the transmission antenna pair currently performing the uplink and downlink transmission to the final antenna pair which has the lowest RSSI to perform the data transmission.

The detection unit 120 can detect the variety of the data transmission rate periodically, such like detecting once every predetermined period. The length of the predetermined period can be adjusted according to user's requirement. In an environment with small interference, that will be redetected if a specific condition is occurred. For example, once the interference occurs, that is redetected. In addition, the present invention is not limited to the two extreme conditions, such like RSSI peak and RSSI null. The present invention can also use the second highest RSSI value or the RSSI slightly higher than the lowest RSSI.

The present invention provides an adaptive device and method for wireless network, which is adapted for a MIMO system of a wireless area network. The present invention chooses one antenna pair of the plurality of antenna pairs of the MIMO system to perform an uplink or downlink transmission according to the RSSI and the data transmission rate. Compared to the transitional way that choosing the antennal pair is merely based on the RSSI. The present invention further instantly adjusts which antenna pair to perform transmission according to the data transmission rate that reflects the real-time communication quality. The wireless network adaptive device of the present invention chooses the transmission antenna based on the RSSI and the data transmission rate simultaneously. Accordingly, the network quality will be improved.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A wireless network adaptive device, adapted for choosing one of a plurality of antenna pairs of a Multiple Input Multiple Output (MIMO) antenna system to be a transmission antenna pair to perform data transmission, comprising:
   a sensor, connected to the plurality of antenna pairs, wherein the sensor detects a Received Signal Strength Indicator (RSSI) of the plurality of antenna pairs;
   a memory, connected to the sensor, wherein the memory stores the RSSI of each of the plurality of antenna pairs detected by the sensor; and
   a processor, connected to the sensor and the memory, wherein the processor chooses a first antenna pair which has the highest RSSI and a final antenna pair which has the lowest RSSI according to the RSSI of the plurality of antenna pairs stored in the memory, the processor also chooses the first antenna pair or the final antenna pair to be the transmission antenna pair, the processor further controls the sensor to detect a data transmission rate of the transmission antenna pair, and the processor switches the first antenna pair or the final antenna pair to be the transmission antenna pair according to a variety of a data transmission rate.

2. The wireless network adaptive device of claim 1, wherein the transmission antenna pair further performs an uplink data transmission and a downlink data transmission, when the processor determines that an uplink data transmission rate is abnormal according to a detection result of the sensor, the processor changes the transmission antenna pair used for currently performing the uplink data transmission from first antenna pair to the final antenna pair, or the processor changes the transmission antenna pair used for currently performing the uplink data transmission from final antenna pair to the first antenna pair.

3. The wireless network adaptive device of claim 2, when the uplink data transmission rate is abnormal, the uplink data transmission rate is less than the downlink data transmission rate to reach a first threshold, the processor changes the transmission antenna pair used for currently performing the uplink data transmission from first antenna pair to the final antenna pair, or the processor changes the transmission antenna pair used for currently performing the uplink data transmission from final antenna pair to the first antenna pair.

4. The wireless network adaptive device of claim 2, when the uplink data transmission rate is abnormal, the uplink data transmission rate is less than a historical uplink data transmission rate to reach a second threshold, the processor changes the transmission antenna pair used for currently performing the uplink data transmission from first antenna pair to the final antenna pair, or the processor changes the transmission antenna pair used for currently performing the uplink data transmission from final antenna pair to the first antenna pair.

5. The wireless network adaptive device of claim 1, wherein the transmission antenna pair further performs an uplink data transmission and a downlink data transmission, when the processor determines that a downlink data transmission rate is abnormal according to a detection result of the sensor, the processor changes the transmission antenna pair used for currently performing the downlink data transmission from first antenna pair to the final antenna pair, or the processor changes the transmission antenna pair used for currently performing the uplink data transmission from final antenna pair to the first antenna pair.

6. The wireless network adaptive device of claim 5, when the downlink data transmission rate is abnormal, the downlink data transmission rate is less than the uplink data transmission rate to reach a first threshold, the processor changes the transmission antenna pair used for currently performing the downlink data transmission from first antenna pair to the final antenna pair, or the processor changes the transmission antenna pair used for currently performing the downlink data transmission from final antenna pair to the first antenna pair.

7. The wireless network adaptive device of claim 5, when the downlink data transmission rate is abnormal, the downlink data transmission rate is less than a historical downlink data transmission rate to reach a second threshold, the processor changes the transmission antenna pair used for currently performing the downlink data transmission from first antenna pair to the final antenna pair, or the processor changes the transmission antenna pair used for currently performing the downlink data transmission from final antenna pair to the first antenna pair.

8. A wireless network adaptive method, adapted for choosing one of a plurality of antenna pairs of a Multi Input Multiple Output (MIMO) antenna system of a wireless area network to be a transmission antenna pair to perform data transmission, comprising:
   detecting a Received Signal Strength Indicator (RSSI) of the plurality of antenna pairs;
   choosing a first antenna pair which has the highest RSSI and a final antenna pair which has the lowest RSSI according to the RSSI of the plurality of antenna pairs;
   choosing the first antenna pair or the final antenna pair to be the transmission antenna pair to perform an uplink data transmission and a downlink data transmission;
   detecting an uplink data transmission rate and a downlink data transmission rate of the transmission antenna pairs;
   adjusting other antenna pairs to perform data transmission according to the uplink data transmission rate and the downlink data transmission rate;
   changing the transmission antenna pair used for currently performing the uplink data transmission from first antenna pair to the final antenna pair or changing the transmission antenna pair used for currently performing the uplink data transmission from final antenna pair to the first antenna pair when the uplink data transmission rate is abnormal; and
   changing the transmission antenna pair used for currently performing the downlink data transmission from first antenna pair to the final antenna pair or changing the transmission antenna pair used for currently performing the downlink data transmission from final antenna pair to the first antenna pair when the downlink data transmission rate is abnormal.

9. The wireless network adaptive method of claim 8, further comprising: when the uplink data transmission rate is abnormal, the uplink data transmission rate is less than the downlink data transmission rate to reach a first threshold or the uplink data transmission rate is less than a historical uplink data transmission rate to reach a second threshold, changing the transmission antenna pair used for currently performing the uplink data transmission from first antenna pair to the final antenna pair, or changing the transmission antenna pair used for currently performing the uplink data transmission from final antenna pair to the first antenna pair.

10. The wireless network adaptive method of claim 8, further comprising: when the downlink data transmission rate is abnormal, the downlink data transmission rate is less than the uplink data transmission rate to reach a first threshold or the downlink data transmission rate is less than a historical downlink data transmission rate to reach a second threshold, changing the transmission antenna pair used for currently performing the downlink data transmission from first antenna pair to the final antenna pair, or changing the transmission antenna pair used for currently performing the downlink data transmission from final antenna pair to the first antenna pair.

* * * * *